(12) United States Patent
Foster

(10) Patent No.: US 8,157,076 B2
(45) Date of Patent: Apr. 17, 2012

(54) HYDRAULIC CONTROL FOR A PARK BY WIRE SYSTEM USED IN A MULTIMODE HYBRID TRANSMISSION

(75) Inventor: Michael D. Foster, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 778 days.

(21) Appl. No.: 12/255,050

(22) Filed: Oct. 21, 2008

(65) Prior Publication Data

US 2009/0249913 A1    Oct. 8, 2009

Related U.S. Application Data

(60) Provisional application No. 61/042,375, filed on Apr. 4, 2008.

(51) Int. Cl.
*B60T 11/10* (2006.01)
*F16H 59/00* (2006.01)

(52) U.S. Cl. ............... 192/221; 74/335; 74/473.11
(58) Field of Classification Search ............... 74/473.11
See application file for complete search history.

(56) References Cited

U.S. PATENT DOCUMENTS

| | | | |
|---|---|---|---|
| 4,899,785 A * | 2/1990 | Inokuchi | 91/433 |
| 5,078,242 A | 1/1992 | Ratke et al. | |
| 5,370,449 A | 12/1994 | Edelen et al. | |
| 7,862,471 B2 * | 1/2011 | Koski et al. | 477/97 |
| 2008/0214350 A1 * | 9/2008 | Powell et al. | 475/121 |

FOREIGN PATENT DOCUMENTS

| | | |
|---|---|---|
| CN | 101021264 A | 8/2007 |
| DE | 4127991 A1 | 2/1993 |
| DE | 4322523 A1 | 1/1995 |
| JP | 6192344 A | 7/1994 |

* cited by examiner

*Primary Examiner* — Rodney Bonck
(74) *Attorney, Agent, or Firm* — Quinn Law Group, PLLC

(57) ABSTRACT

A servo valve for shifting a transmission between a park and out of park position includes a valve housing and a park servo. A first and second solenoid is disposed in the valve housing for transmitting a respective first or second signal to shift the transmission to the respective first or second state of operation. The park servo is fluidly connected to the transmission and is responsive to the first and second signals to shift the transmission to the respective positions. Fluid pressure within the valve housing moves a valve member therein to move a piston within the park servo to shift the transmission to the corresponding position. A third solenoid transmits a third signal in combination with the second signal to latch and hold the valve member in the corresponding position.

17 Claims, 2 Drawing Sheets

US 8,157,076 B2

HYDRAULIC CONTROL FOR A PARK BY WIRE SYSTEM USED IN A MULTIMODE HYBRID TRANSMISSION

CROSS-REFERENCE TO RELATED APPLICATIONS

The subject patent application claims priority to and all the benefits of U.S. Provisional Patent Application Ser. No. 61/042,375, filed on Apr. 4, 2008, which is expressly incorporated herein by reference in its entirety.

TECHNICAL FIELD

The present invention relates to a system and method for controlling park positions in a park by wire system for a hybrid transmission.

BACKGROUND OF THE INVENTION

A typical vehicle includes a transmission which is shiftable between a park position, for parking the vehicle, and various out of park positions, for allowing the vehicle to move. A cable extends between the transmission and a lever, inside the vehicle. A user of the vehicle physically moves the lever to pull or push the cable and physically shift the transmission between the park position and the out of park position.

SUMMARY OF THE INVENTION

A servo assembly is configured to shift a hybrid transmission between a first state of operation and a second state of operation. The servo assembly includes a valve housing that extends between a first end and a second end. The valve housing defines a valve chamber that extends between the ends. A relay valve is slidably disposed within the valve chamber between a first position and a second position. A park servo is in fluid communication with the valve chamber and is movable between a first condition, to move the hybrid transmission to the first state of operation, and a second condition, to move the transmission to the second state of operation. A pressure supply port is defined in the valve housing and opens to the valve chamber. The pressure supply port is configured to selectively open to allow fluid to enter the valve housing through the pressure supply port and move the park servo to the second condition. The park servo is configured to move the hybrid transmission to the second state of operation when the park servo moves to the second condition.

A method of shifting a hybrid transmission between a first state of operation and a second state of operation with a servo assembly having a valve housing and a park servo includes directing fluid through a pressure supply line to a valve chamber of the valve housing to apply a fluid pressure to a relay valve. A relay valve is slid to one of a first position, corresponding to the first state of operation, and a second position, corresponding to the second state of operation. Fluid is directed from one of the valve chamber and the park servo to the other one of the valve chamber and the park servo as a function of the relay valve being in one of the second position and the first position, respectively.

A servo assembly is configured to shift a hybrid transmission between a park position and an out of park position. The servo assembly includes a valve housing that extends between a first end and a second end and defines a valve chamber that extends between the ends. A relay valve is slidably disposed within the valve chamber between a first position and a second position. A first solenoid is disposed in the first end of the valve housing and is configured to transmit fluid into the valve chamber at a first solenoid pressure to move the relay valve to a first position. A second solenoid is disposed in the second end of the valve housing and is configured to transmit fluid into the valve chamber at a second solenoid pressure to move the relay valve to a second position. A park servo is in fluid communication with the valve chamber and is movable between a first condition and a second condition. A pressure supply port is defined in the valve housing and opens to the valve chamber. The pressure supply port is configured to selectively open and allow fluid to enter the valve housing through the pressure supply port and move the park servo from the first condition to the second condition. The park servo is configured to move the hybrid transmission from the park position to the out of park position when the park servo moves from the first condition to the second condition.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
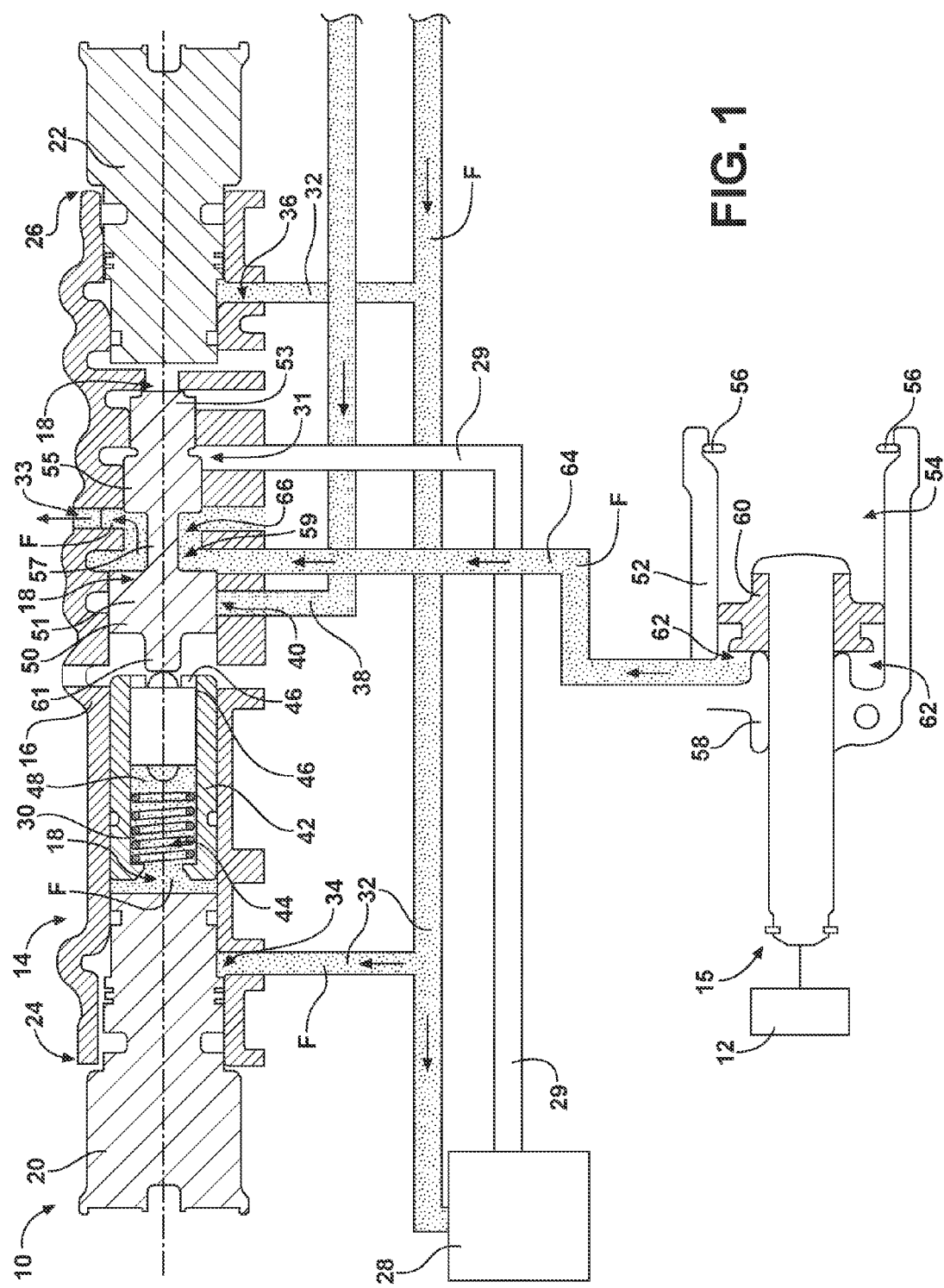
FIG. 1 is a schematic view depicting a hydraulic mechanism for controlling a hybrid transmission with the mechanism in a park position.

Referring to the drawings, wherein like reference numbers refer to like components, FIG. 1 shows a servo assembly or "park by wire mechanism" 10 for shifting a transmission 12 between a first position and a second position. In the embodiment shown in the Figures, the first position is a park position, shown in FIG. 1, and the second position is an out of park position, shown in FIG. 2, in a park by wire system for a vehicle. It should be appreciated, however, that the first position and the second position are not limited to being the positions shown and described herein as other positions may also be used as known to those skilled in the art. The servo assembly 10 includes a valve assembly 14 and a park servo 15. A plurality of solenoids 20, 22, 28 are configured for setting the park position. The park servo 15 is configured for moving between a park position and an out of park position. The solenoids 20, 22, 28 are in operative communication with a shifter (not shown), e.g., a switch, etc., for selecting between the park position and the out of park position for the transmission 12. Therefore, by using the shifter to select the desired position of the transmission 12, the shifter sends a series of signals to one of the solenoids 20, 22, 28 for moving the park servo 15 to the corresponding desired transmission 12 position.

The valve assembly 14 includes a valve housing 16 which extends between opposing ends 24, 26 and defines a valve chamber 18 that extends between the ends 24, 26. A return to park solenoid (RTP solenoid) 20, which produces a RTP signal pressure, is disposed at the first end 24 of the valve housing 16 and an out of park solenoid (OOP solenoid) 22, which produces an OOP signal pressure, is disposed at the second end 26 of the valve housing 16, opposite the first end 24 of the valve housing 16. Therefore, the RTP and the OOP solenoids 20, 22 are in fluid communication with the valve chamber 18 of the valve housing 16.

A Y solenoid 28, which produces a Y signal pressure, is operatively connected to the valve assembly 14. A Y signal port 31 is defined by the valve housing 16. A Y signal line 29 is disposed between the Y solenoid 28 and the Y signal port 31 such that the Y solenoid 28 is in fluid communication with the valve chamber 18 of the valve housing 16. The Y solenoid 28 supplies a Y signal pressure to the valve housing 16 through the Y signal port 31.

A solenoid pressure supply line 32 is in fluid communication with the RTP solenoid 20, via a RTP control port 34 that opens to the valve chamber 18, and the OOP solenoid 22, via an OOP control port 36 that opens to the valve chamber 18. The solenoid pressure supply line 32 is also in fluid communication with the Y solenoid 28. Therefore, the solenoid pressure supply line 32 supplies a solenoid pressure to the RTP solenoid 20, the OOP solenoid 22, and the Y solenoid 28. An inlet pressure supply line 38 is in fluid communication with a pressure supply port 40 defined in the valve housing 16 to supply an inlet pressure to the valve chamber 18 within the valve housing 16. The pressure supply port 40 may be defined in the valve housing 16 between the Y signal port 31 and the RTP solenoid 20. The inlet pressure is typically at a higher pressure than the solenoid pressure moving through the solenoid pressure supply line 32. Therefore, each solenoid 20, 22, 28 is in fluid communication with the valve chamber 18 of the valve assembly 14.

A sleeve 42 may be disposed within the valve chamber 18 of the valve housing 16, adjacent the RTP solenoid 20. The sleeve 42 defines a hollow interior 44. A return spring 30, which may be a coil spring, is disposed within the sleeve 42 between the RTP solenoid 20 and the retainer 46. An actuator 48 may be slidably disposed within the sleeve 42 between the return spring 30 and the retainer 46. The retainer 46 keeps the actuator 48 contained within the sleeve 42 during assembly only. The actuator 48 is generally cylindrical, but may be any shape known to those skilled in the art. A relay valve 50 is slidably disposed within the valve chamber 18, adjacent the OOP solenoid 22. Therefore, the relay valve 50 is slidably disposed between the OOP solenoid 22 and the actuator 48. The return spring 30 biases the actuator 48 away from the RTP solenoid 20, which pushes the relay valve 50 away from the RTP solenoid 20.

The relay valve 50 includes a first section 51, a second section 53, and an intermediate section 55. A connector 57 extends between the first section 51 and the intermediate section 55. The intermediate section 55 extends between the connector 57 and the second section 53. The first section 51 is disposed in the valve chamber 18 adjacent the actuator 48. The second section 53 is disposed in the valve chamber 18 adjacent the OOP solenoid 22. The intermediate section 55 is disposed in the valve chamber 18 such that an intermediate chamber 59 is defined between the first section 51 and the intermediate section 55. A nose 61 may extend from the first section 51, opposite the connector 57, such that the nose 61 keeps the actuator 48 spaced from the first section 51. The surface area presented by the first section 51 within the valve chamber 18 is larger than the surface area presented by the second section 53 within the valve chamber 18.

Prior to the OOP solenoid 22 receiving the OOP pressure signal to activate and open, the valve chamber 18 must first be exhausted. When the OOP solenoid 22 receives the signal to shift the transmission 12 out of the park position, the OOP solenoid 22 opens and fluid F moves through the OOP solenoid 22 and into the valve chamber 18 between the relay valve 50 and the OOP solenoid 22 to apply the OOP signal pressure to the area on the second side of the second section 53. If the OOP solenoid 22 is open, then the RTP solenoid 20 is de-energized such that the RTP solenoid 20 is closed. The OOP signal pressure of fluid F that enters the valve chamber 18 and is acting on the second side of the second section 53 causes the relay valve 50 to move toward the sleeve 42. Eventually, the relay valve 50 pushes the actuator 48 and the actuator 48 compresses the return spring 30. The pressure that moves the relay valve 50 needs to be great enough to not only slide the relay valve 50 and the actuator 48 toward the RTP solenoid 20, but also great enough to compress the return spring 30. As long as the OOP solenoid 22 is actuated, fluid F remains in the valve chamber 18 between the second side of the second section 53 and the OOP solenoid 22, keeping the return spring 30 compressed by the actuator 48 and the relay valve 50.

If the RTP solenoid 20 receives the signal to shift the transmission 12 to the park position, the RTP solenoid 20 opens and fluid F moves through the return to park solenoid 20 and into the valve chamber 18 between the actuator 48 and the RTP solenoid 20. If the RTP solenoid 20 is open, the OOP solenoid 22 is de-energized such that the OOP solenoid 22 is closed. The pressure of fluid F that enters the valve chamber 18 from the RTP solenoid 20 acts on an area on the actuator 48 which causes the actuator 48 and the relay valve 50 to slide away from the RTP solenoid 20, toward the OOP solenoid 22. The pressure that moves the actuator 48 needs to be great enough to also slide the relay valve 50.

The park servo 15 is operatively connected between the valve housing 16 of the isolator valve 14 and the transmission 12 for shifting into and out of the park position based on whether the RTP or the OOP solenoid 20, 22 is energized. The out of park and the return to park positions are based solely on the position of the relay valve 50. The park servo 15 is slidably disposed within a servo housing 52. The servo housing 52 defines a hollow core 54 and extends to an end. A retainer 56, which is disposed at the end of the servo housing 52, extends to partially cover the end for retaining the park servo 15 within the servo housing 52 when the servo slides toward the retainer 56. A neck 58 is formed on the servo housing 52, opposite the retainer 56. The neck 58 is a hollow portion of the servo housing 52 and the neck 58 receives a portion of the park servo 15. The park servo 15 is slidably disposed within the neck 58 and a seal is formed between the neck 58 and the park servo 15, as the park servo 15 slides within the neck 58. A piston 60 extends about a portion of the park servo 15. The piston 60 moves with the park servo 15 and is therefore slidably disposed within the servo housing 52, while sealing therebetween. A servo chamber 62 is defined within the servo housing 52, between the neck 58 of the servo chamber 62 and the piston 60 of the park servo 15. The servo chamber 62 changes volume based on the position of the piston 60 within the housing. A servo supply line 64 extends between the servo housing 52 and the valve housing 16 and supplies a fluid pressure to the servo chamber 62 within the servo housing 52. The servo supply line 64 extends to a servo supply port 66 that opens to the intermediate chamber 59 defined between the first section 51 and the intermediate section 55. The servo supply port 66 is defined in the valve housing 16 between the pressure supply port 40 and the Y signal port 31. An exhaust port 33 is defined by the valve housing 16 between the servo supply port 66 and the Y signal port 31. Both the servo supply port 66 and the exhaust port 33 are in fluid communication with the intermediate chamber 59 when the RTP solenoid 20 is actuated such that the RTP signal pressure is acting on the actuator 48 to move the relay valve 50 toward the OOP solenoid 22. When the relay valve 50 is in this position, fluid F from the servo chamber 62 exits the servo chamber 62 via the servo supply line 64 and enters the intermediate chamber 59 and is exhausted from the intermediate chamber 59 and relay valve via the exhaust port 33. Both the servo supply port 66 and the pressure supply port 40 open to the intermediate chamber 59 when the OOP solenoid 22 is actuated such that the OOP signal pressure is acting on the second side of the second section 53 of the relay valve 50 to move the relay valve 50 and the actuator 48 toward the RTP solenoid 20. Fluid F enters the pressure supply port 40 and flows into the intermediate chamber 59 at a latch pressure. Fluid F acts against the area of the second side of the first section 51 to hold the relay valve 50 and the actuation 48 toward the RTP solenoid. The latch pressure is sufficient to overcome the spring force of the return spring 30 and hold the relay valve 50 in this position. Pressurizing the park servo 15 pulls the transmission 12 out of the park position, as shown in FIG. 2, and depressurizing, or exhausting, the park servo 15 shifts the transmission 12 into the park position, as shown in FIG. 1.

The Y solenoid 28 may operate to send the Y signal to the valve chamber 18 of the valve housing 16 through the Y supply line 29. If the out of park position is desired and the RTP solenoid 20 does not de-energize, the Y solenoid 28 can be energized and the pressure of the Y signal will combine with the pressure from the OOP solenoid 22 and the latch pressure and act on the second side of the intermediate section 55 of the relay valve 50 to overcome the pressure from the RTP solenoid 20 and spring force of the return spring 30. Additionally, if the OOP solenoid 22 does not energize, the Y signal can operate to overcome the spring force of the return spring 30 to shift from the park position to the out of park position. These features provide two redundant methods for shifting from the park position to the out of park position.

Figure 2:
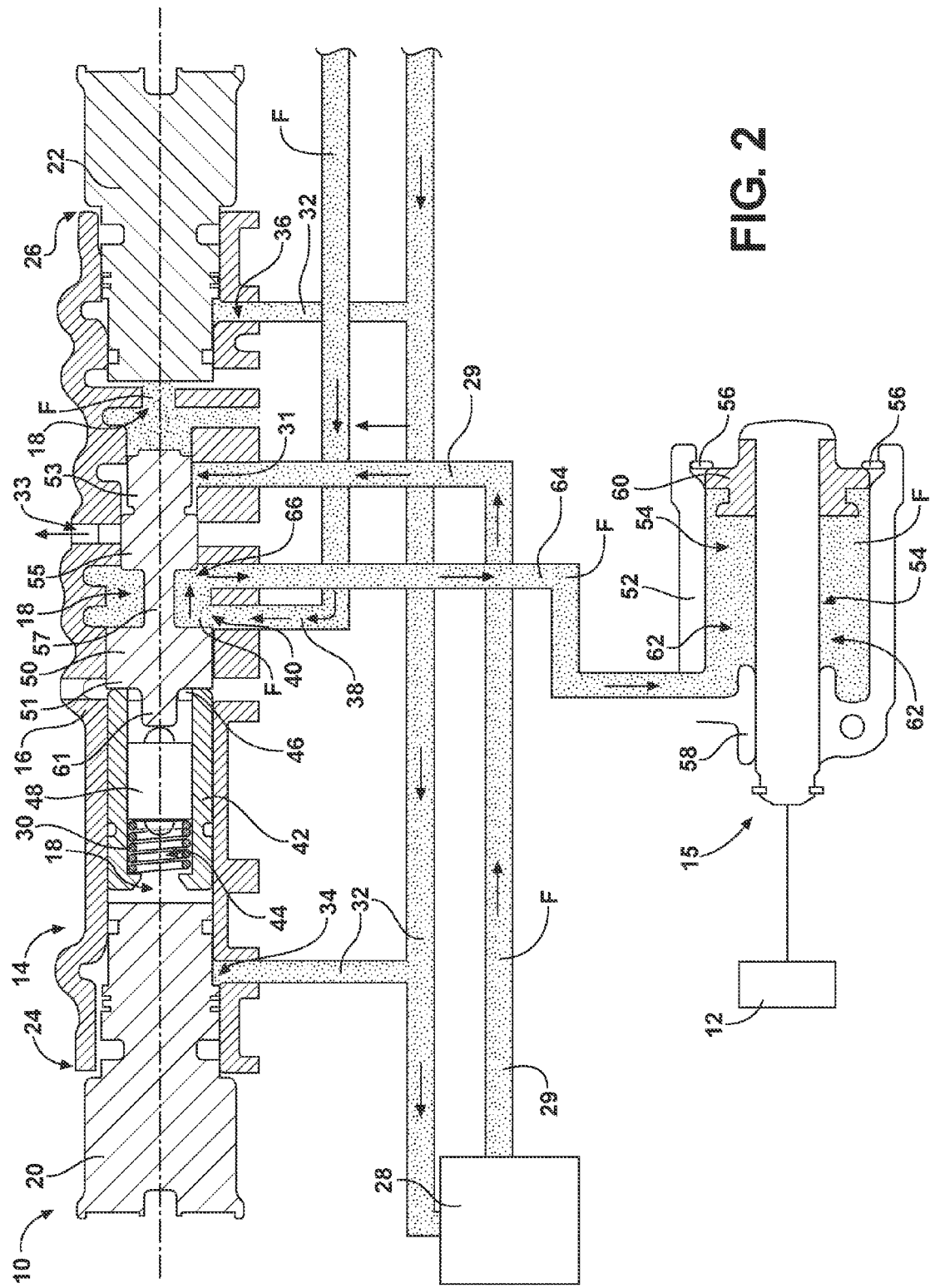
FIG. 2 is a schematic view depicting the hydraulic mechanism of FIG. 1 with the mechanism in an out of park position.

When the OOP solenoid 22 is activated, as shown in FIG. 2, the OOP solenoid 22 opens and fluid F enters the valve chamber 18 through the OOP solenoid 22 at the OOP signal pressure to apply a force on the second side of the second section 53 of the relay valve 50 to slidably move the relay valve 50 and the actuation toward the RTP solenoid 20. The relay valve 50 pushes the actuator 48 to slide the actuator 48 against the return spring 30, to compress the return spring 30. When the valve assembly 14 is acted upon by the OOP signal pressure, the relay valve 50 strokes and opens the servo supply port 66 to supply fluid to the servo chamber 62 of the park servo 15. In the out of park position, pressure at the servo supply port 66 acts upon the differential area of the second side of the first section 51 of the relay valve 50 to latch the valve assembly 14 in the out of park position. To return to park, the RTP solenoid 20 and the spring 30 combine to overcome the latch force acting on the relay valve 50 and move the relay valve 50 to a position where fluid F is exhausted from the servo chamber 62 through the servo supply line 64 and into the intermediate chamber 59. From the intermediate chamber 59, fluid F is exhausted through the exhaust port 33.

To keep the transmission 12 in the park position, the RTP solenoid 20 is energized, as shown in FIG. 1, and the RTP signal output pressure from the RTP solenoid 20 acts on the actuator 48 of the valve assembly 14. The RTP signal pressure from the RTP solenoid 20 combines with the spring force of the return spring 30 toward the OOP solenoid 22 to hold the valve assembly 14 in the park position. Even if the OOP solenoid 22 comes on, or is energized, the valve assembly 14 will remain in the park position because the output pressure, and the resultant force, applied by the OOP solenoid 22 to the second section 53 of the relay valve 50 cannot overcome the force applied by the RTP solenoid 20 when combined with the spring force of the return spring 30. The RTP solenoid 20 must first de-energize to allow the system to shift from the park position to the out of park position. This feature prevents unexpected shifts from the park position to the out of park position.

Once the transmission 12 is out of the park position, the force provided by the OOP signal pressure from the OOP solenoid 22 combines with the latch force from a servo latch pressure that is created when the high pressure from the inlet pressure supply line 38 is routed through the pressure supply port 40 and into the servo supply line 64 to maintain the valve assembly 14 in the out of park position. These two forces are greater than the forces of the RTP solenoid 20 when combined with the spring force of the return spring 30. Therefore, the forces of the OOP solenoid 22 and the servo latch pressure provide a redundant method to prevent the transmission 12 from unexpectedly returning to the park position. To typically return to the park position, the OOP solenoid 22 is de-energized and the RTP solenoid 20 is energized. The force of the RTP signal pressure from the RTP solenoid 20 combines with the spring force of the return spring 30 to overcome the force of the servo latch and return to the park position. In the event that the OOP solenoid 22 does not release, i.e., is not de-energized, and the servo latch cannot be broken, the hybrid system allows the engine to stop until the park position is achieved. As the system hydraulic pressure is lost, the valve assembly 14 destrokes under the spring force of the return spring 30, allowing the park servo 15 to exhaust and return to the park position.

While the best modes for carrying out the invention have been described in detail, those familiar with the art to which this invention relates will recognize various alternative designs and embodiments for practicing the invention within the scope of the appended claims.

The invention claimed is:

1. A servo assembly for shifting a hybrid transmission between a first state of operation and a second state of operation, said servo assembly comprising:

a valve housing having a first end and a second end and defining a valve chamber extending between said ends;

a relay valve slidably disposed within said valve chamber between a first position and a second position;

a park servo in fluid communication with said valve chamber and movable between a first condition to move the hybrid transmission to the first state of operation and a second condition to move the transmission to the second state of operation;

a pressure supply port defined in said valve housing and opening to said valve chamber, and configured to selectively open to allow a fluid to enter said valve housing through said pressure supply port and move said park servo to said second condition;

wherein said park servo is configured to move the hybrid transmission to the second state of operation when said park servo moves to said second condition;

an exhaust valve defined in said housing, opening to said valve chamber, and configured to selectively open to exhaust fluid from said park servo and said valve housing when said pressure supply port is not open;

a first solenoid operatively disposed in said first end of said valve housing and configured to transmit fluid into said valve chamber at a first fluid pressure to move said relay valve to said first position; and a second solenoid operatively disposed in said second end of said valve housing and configured to transmit fluid into said valve chamber at a second fluid pressure to move said relay valve to said second position.

2. A servo assembly, as set forth in claim 1, wherein said pressure supply port is configured to selectively close in response to said valve blocking said pressure supply port and said exhaust port is configured to selectively close in response to said valve blocking said exhaust port.

3. A servo assembly, as set forth in claim 2, wherein said relay valve is slidable to said first position to close said pressure supply port and open said exhaust portion, and said relay valve is slidable to said second position to close said exhaust port and open said pressure supply port.

4. A servo assembly, as set forth in claim 1, further comprising a return spring disposed in said valve chamber between said relay valve and said first solenoid such that said second fluid pressure from said second solenoid is sufficient to move said relay valve to said second position and compress said return spring.

5. A servo assembly, as set forth in claim 4, further comprising a solenoid pressure supply line in fluid communication with each of said first solenoid and said second solenoid and configured to supply fluid to each of said solenoids.

6. A servo assembly, as set forth in claim 5, further comprising a Y solenoid in fluid communication with each of said solenoid pressure supply line and said valve chamber and configured to supply fluid to said valve housing at a Y signal pressure to hold said relay valve in said second position such that said park servo remains in said second condition to retain the hybrid transmission in the second state of operation.

7. A servo assembly, as set forth in claim 1, wherein said relay valve includes a first section and a second section and a connector interconnecting said first section and said second section and an intermediate chamber defined between said first section and said second section, wherein said pressure supply port opens to said intermediate chamber when said relay valve is in said second position and said exhaust port opens to said intermediate chamber when said relay valve is in said first position.

8. A servo assembly, as set forth in claim 7, wherein said park servo is in continuous fluid communication with said intermediate chamber.

9. A servo assembly, as set forth in claim 7, wherein said park servo includes a servo housing defining a servo chamber and a piston slidably disposed in said servo housing between said first condition and said second condition.

10. A servo assembly, as set forth in claim 9, wherein a volume of said chamber increases as said piston moves from said first condition to said second condition such that fluid is exhausted from said servo chamber when said piston is in said first condition and fluid fills said chamber when said piston is in said second condition.

11. A method of shifting a hybrid transmission between a first state of operation and a second state of operation with a servo assembly having a valve housing and a park servo, said method comprising:
   directing fluid through a pressure supply line to a valve chamber of the valve housing to apply a fluid pressure to a relay valve;
   sliding a relay valve to one of a first position, corresponding to the first state of operation, and a second position, corresponding to the second state of operation; and
   directing fluid from one of the valve chamber and the park servo to the other one of the valve chamber and the park servo as a function of the relay valve being in one of the second position and the first position, respectively.

12. A method, as set forth in claim 11, further comprising moving the park servo to a second condition in response to fluid flowing from the park servo to the valve housing.

13. A method, as set forth in claim 11, further comprising moving the park servo to a first condition in response to fluid flowing from the valve housing to the park servo.

14. A method, as set forth in claim 11, wherein directing fluid through a pressure supply line to a valve chamber of the valve housing is further defined as directing fluid through a pressure supply line to an intermediate chamber defined between a first section and a second section of the relay valve and the valve housing and further comprising:
   directing fluid from the intermediate chamber to the park servo to move the park servo to the second condition; and
   moving the hybrid transmission to the second state of operation in response to the park servo moving to the second condition.

15. A method, as set forth in claim 14, further comprising maintaining the flow of fluid through the pressure supply line to apply a latch pressure to the first section of the relay valve to maintain the relay valve in the second position and the park servo in the second condition to hold the hybrid transmission in the second state of operation.

16. A method, as set forth in claim 11, further comprising:
   directing fluid through the pressure supply line to a Y solenoid; and
   operating the Y solenoid to supply fluid to the valve chamber of the valve housing when the relay valve is in the second position to apply a Y signal pressure to the relay valve to maintain the relay valve in the second position and the park servo in the second condition to hold the hybrid transmission in the out of park position.

17. A servo assembly for shifting a hybrid transmission between a park position and an out of park position, said servo assembly comprising:
   a valve housing having a first end and a second end and defining a valve chamber between said ends;
   a relay valve slidably disposed within said valve chamber between a first position and a second position;
   a first solenoid disposed in said first end of said valve housing and configured to transmit fluid into said valve chamber at a first solenoid pressure to move said relay valve to a first position;
   a second solenoid disposed in said second end of said valve housing and configured to transmit fluid into said valve chamber at a second solenoid pressure to move said relay valve to a second position;
   a park servo in fluid communication with said valve chamber and movable between a first condition and a second condition; and
   a pressure supply port defined in said valve housing and opening to said valve chamber and configured to selectively open and allow fluid to enter said valve housing through said pressure supply port and move said park servo from said first condition to said second condition;
   wherein said park servo is configured to move the hybrid transmission from the park position to the out of park position when said park servo moves from said first condition to said second condition.

* * * * *